(12) United States Patent
Chen

(10) Patent No.: US 10,867,325 B2
(45) Date of Patent: Dec. 15, 2020

(54) MOBILE GROUP-PURCHASE SYSTEM AND IMPLEMENTING METHOD THEREOF

(71) Applicant: Yi-Chou Chen, New Taipei (TW)

(72) Inventor: Yi-Chou Chen, New Taipei (TW)

(73) Assignee: USA CANAL SOFTWARE CO., LTD., New Castle, DE (US)

( * ) Notice: Subject to any disclaimer, the term of this patent is extended or adjusted under 35 U.S.C. 154(b) by 488 days.

(21) Appl. No.: 15/643,512

(22) Filed: Jul. 7, 2017

(65) Prior Publication Data
US 2018/0012271 A1 Jan. 11, 2018

(30) Foreign Application Priority Data

Jul. 7, 2016 (TW) .............................. 105121568 A

(51) Int. Cl.
*G06Q 30/00* (2012.01)
*G06Q 30/06* (2012.01)

(52) U.S. Cl.
CPC ................................ *G06Q 30/0605* (2013.01)

(58) Field of Classification Search
CPC . G06Q 30/00; G06Q 30/0601; G06Q 30/0605
See application file for complete search history.

(56) References Cited

U.S. PATENT DOCUMENTS

| | | | | |
|---|---|---|---|---|
| 2003/0018561 A1* | 1/2003 | Kitchen | .................. | G06Q 40/04 705/37 |
| 2003/0216933 A1* | 11/2003 | Kwan | .................... | G06Q 30/04 705/39 |
| 2008/0082420 A1* | 4/2008 | Kargman | ................ | G06Q 30/02 705/14.27 |
| 2009/0198577 A1* | 8/2009 | Foreman | ............ | G06Q 30/0601 705/14.17 |
| 2010/0287044 A1* | 11/2010 | Mason | ................ | G06Q 30/0223 705/14.13 |
| 2012/0252579 A1* | 10/2012 | Sethi | ...................... | A63F 13/847 463/40 |
| 2013/0024250 A1* | 1/2013 | Wu | ......................... | G06O 50/01 705/14.1 |

(Continued)

OTHER PUBLICATIONS

Anand, Krishnan S., and Ravi Aron. "Group buying on the web: A comparison of price-discovery mechanisms." Management Science 49.11 (2003): 1546-1562. (Year: 2003).*

*Primary Examiner* — Christopher B Seibert
(74) *Attorney, Agent, or Firm* — Bacon & Thomas, PLLC

(57) ABSTRACT

A mobile group-purchase system and implementing method thereof is provided, in which the system is formed by a group-purchase server and at least one mobile communication device. User can send a group-purchase invitation by a mobile communication device to a plurality of designated mobile communication devices and create an original buying group so that each member of the group can order commodity offered by the group. Moreover, any member of the original buying group can also create an extended sub-group, so that the creator can get more favorable purchase price. When group-purchase activity is completed, the group-purchase server further calculated out a spread profit which is then feedback to the creator of the extended sub-group, so as to encourage the member of the buying group to use the mobile group-purchase system.

3 Claims, 11 Drawing Sheets

(56) References Cited

U.S. PATENT DOCUMENTS

2013/0046590 A1\* 2/2013 Abraham ............... G06Q 30/06
                                                    705/14.1
2016/0379301 A1\* 12/2016 Feldman ................ G06Q 30/08
                                                    705/26.2

\* cited by examiner

MOBILE GROUP-PURCHASE SYSTEM AND IMPLEMENTING METHOD THEREOF

BACKGROUND OF INVENTION

Field of the Invention

The present invention relates to a mobile group-purchase system and implementing method thereof, more particularly to a mobile group-purchase system and implementing method thereof wherein the group-purchase function is mainly conducted by mobile communication device and original buying group can further develop an extended sub-group so as to obtain spread profit of commodity offered by the group.

Brief Description of Prior Art

Accompanying with booming of information network, development of e-commerce has become increasingly vigorous. A variety of online shopping modes have also been launched one by one for consumers to buy and sell on the internet. Websites for providing group shopping is more diverse, general practice of which is to collect a sufficient number of consumers through the group-buying website, so as to buy a third-party company's items, coupons or services with a more favorable price. However, when looking at familiar group purchase service platform, the price of group-purchase product is still decided by the platform or group owner, consumers can not initiate group buying, or decide commodity prices and even cannot get satisfactory incentives themselves. If members of the buying group are allowed to create group-purchase activities and thus get relative rewards (either price in real terms or reward points), desire of participating group-purchase activities of the members can be significantly enhanced.

SUMMARY OF THE INVENTION

Therefore, the main object of the present invention is to provide a mobile group-purchase system using mobile communication device, wherein any member attending the buying group can create another buying sub-group from the original buying group and thus get correlated rewards, and implementing method thereof.

In order to achieve above object, the mobile group-purchase system of the present invention mainly comprises a group-purchase server and at least one mobile communication device, wherein user can execute a group-purchase application program by mobile communication device so as to send a buying group invitation to a plurality of designated mobile communication devices, whereby an original buying group is created and thus recorded in the group-purchase server, and members in the original buying group can make order for the goods offered by the group; any member of the original buying group can use mobile communication device to create an extended sub-group from the original buying group, the group-purchase server will further calculate a reward result (such as a substantial spread profit) according to a default reward method, and return the spread profit to the user who created the extended sub-group. By using mobile communication device to conduct group buying in the present invention, the member in original buying group can create an extended sub-group, the number of participating customers can be expanded quickly, and thus the number of orders to buy goods can be significantly increased and the order speed can also be raised. The user creating the extended buy group can also get relative rewards.

BRIEF DESCRIPTION OF ACCOMPANYING DRAWINGS

The object, technical features and effect of implementation of the present invention will become more apparent by the detailed description of the following embodiment in conjunction with accompanying drawings, in which.

Figure 6:
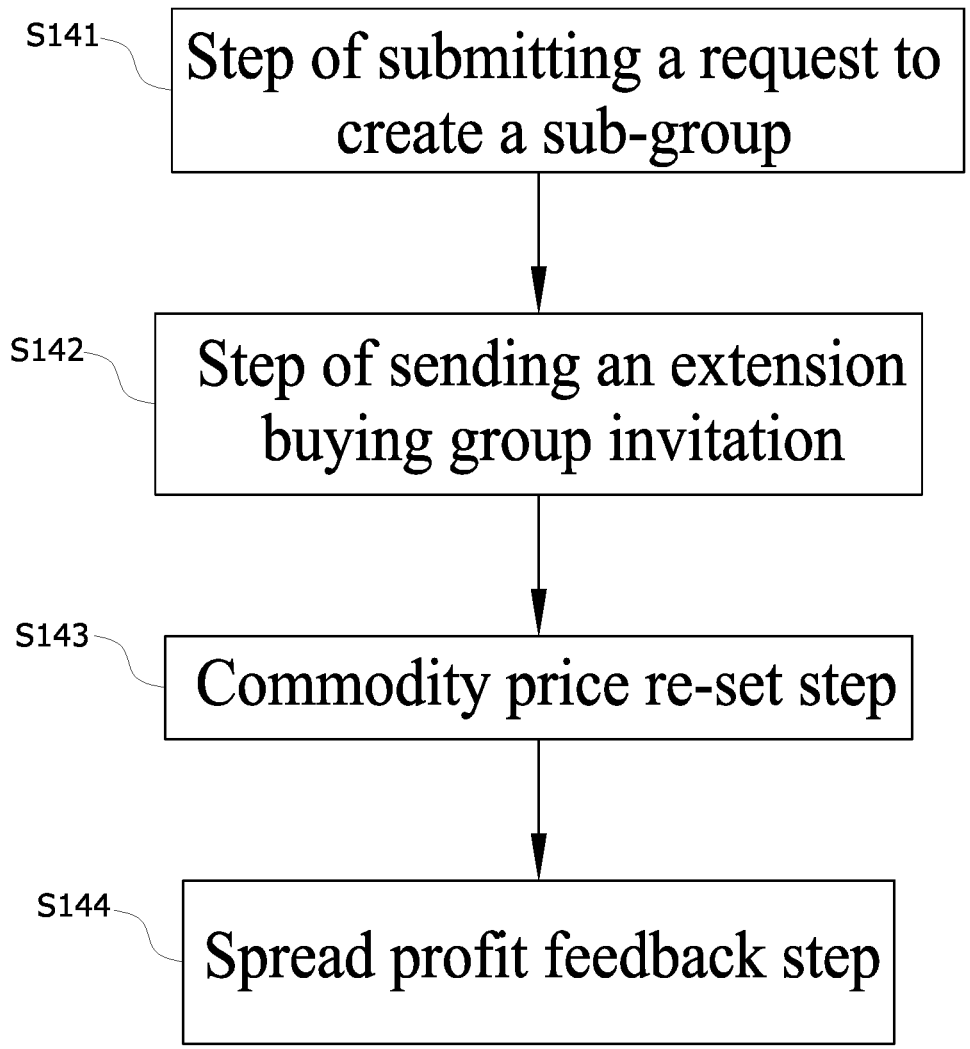
FIG. 6 is a implementing step (II) of the present invention.
Figure 6A:
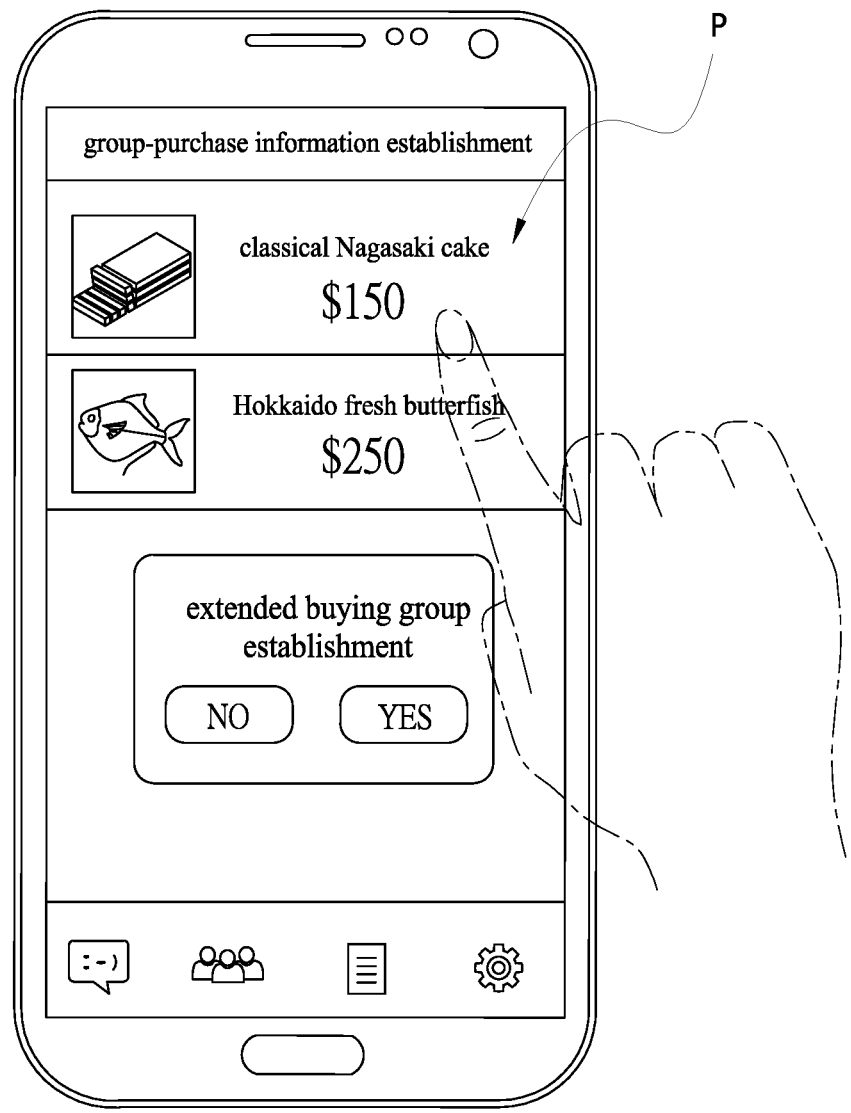
Figure 6B:
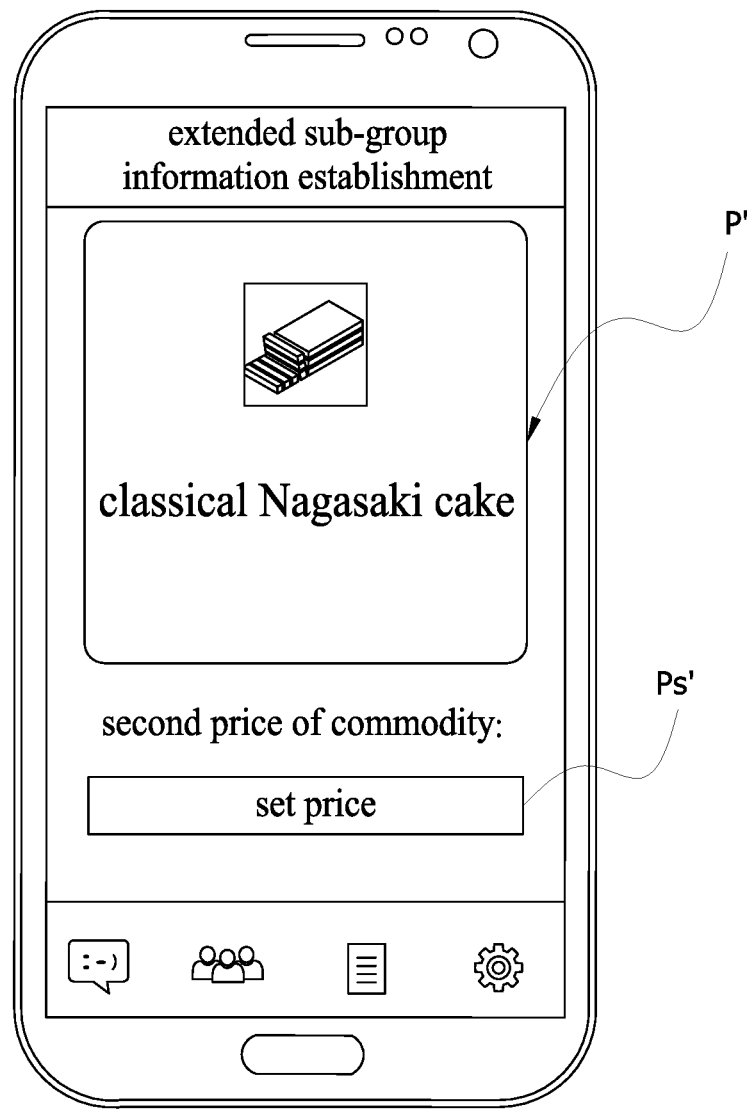
Figure 6C:
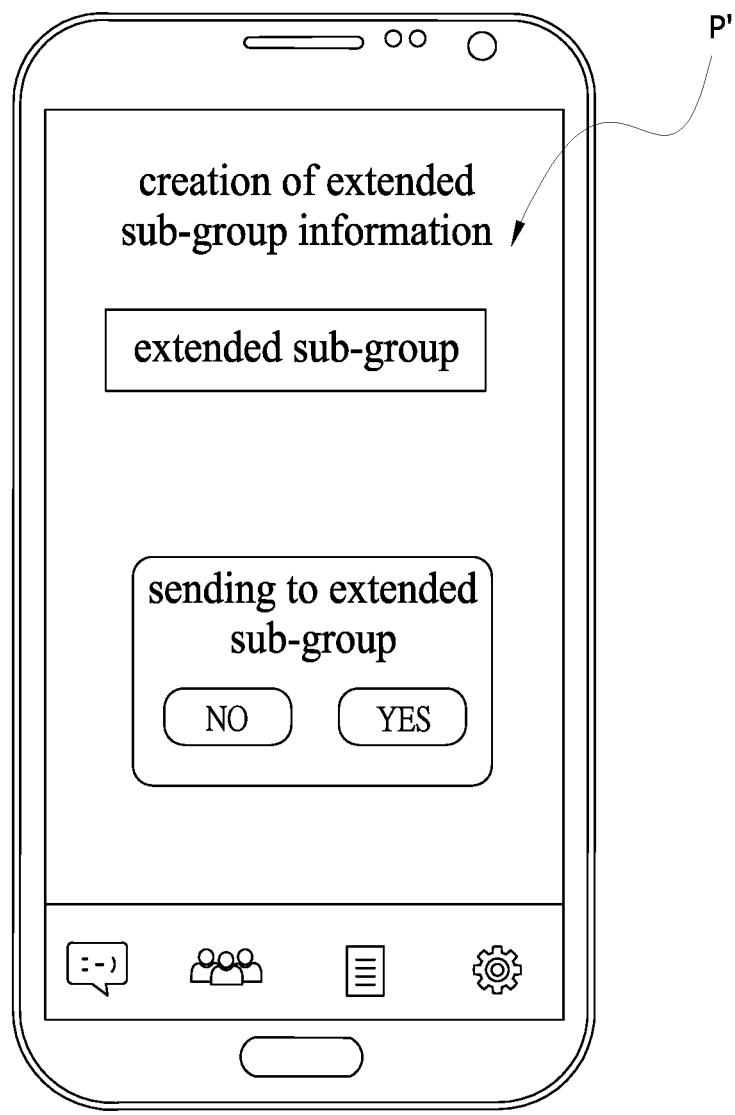
Figure 7:
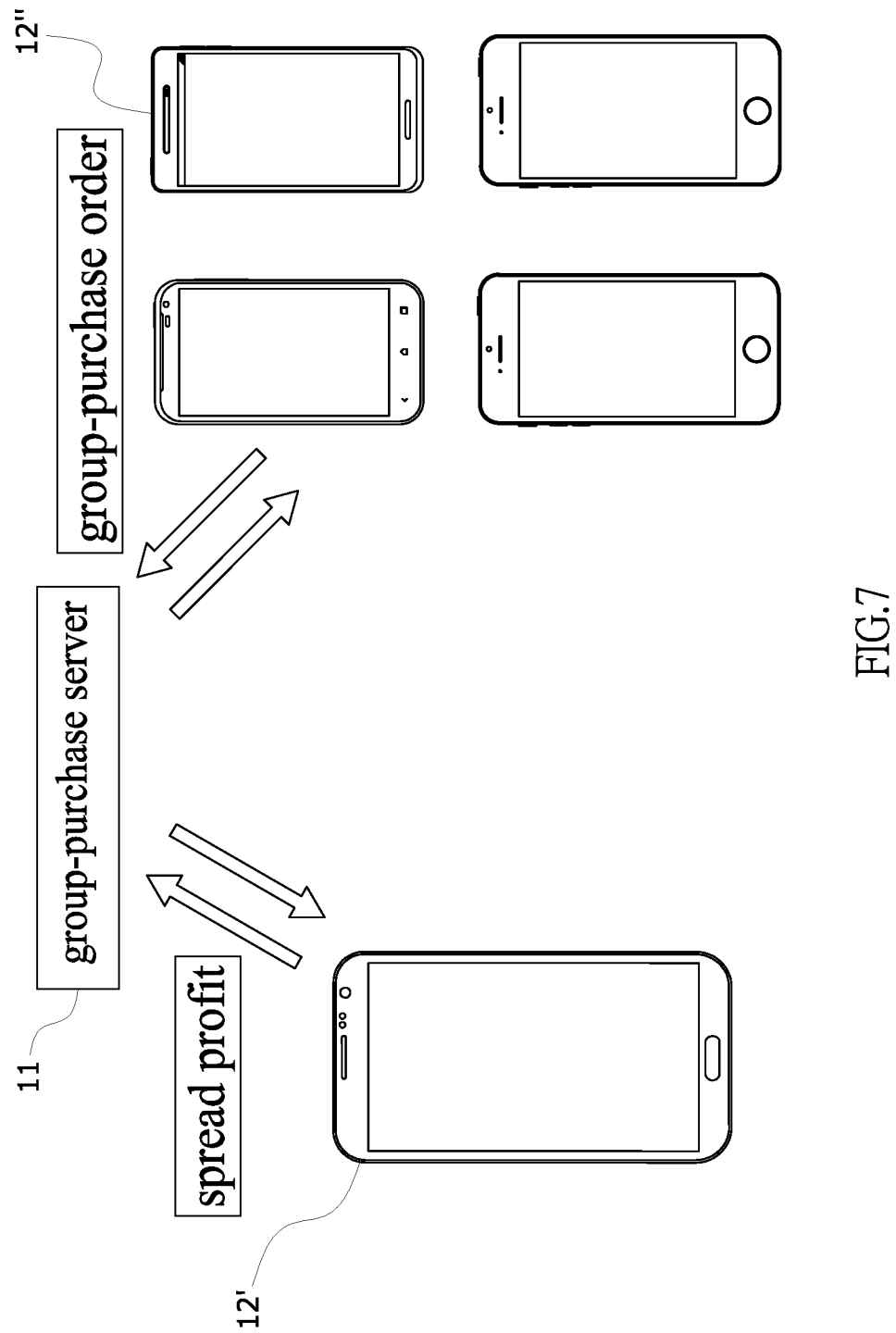
Figure 8:
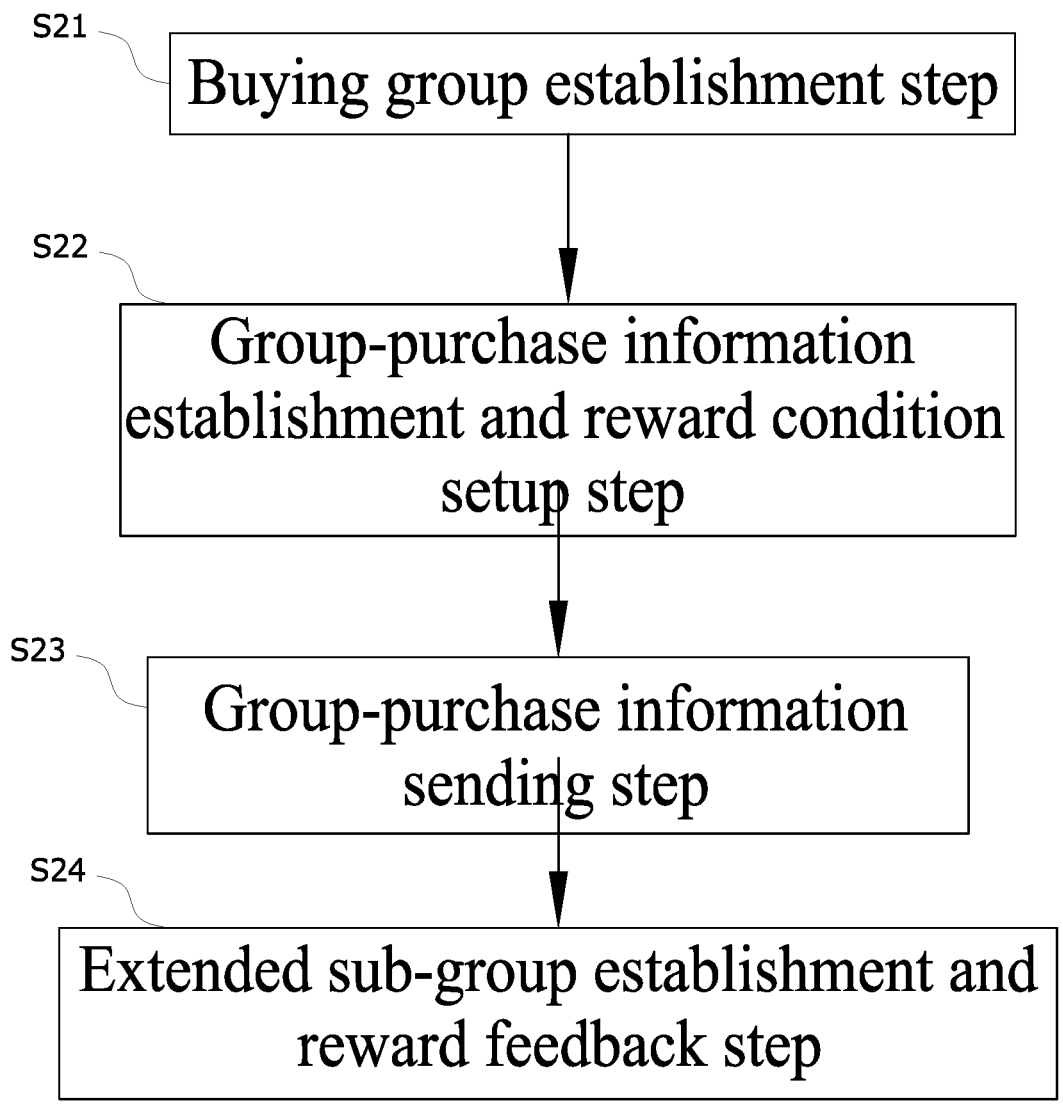

FIG. 6*a* is a schematic view (IV) showing the implementation of the present invention;

FIG. 6*b* is a schematic view (V) showing the implementation of the present invention;

FIG. 6*c* is a schematic view (VI) showing the implementation of the present invention;

FIG. 7 is a schematic view (VII) showing the implementation of the present invention;

FIG. 8 is another embodiment of the present invention.

DETAILED DESCRIPTION OF PREFERRED EMBODIMENTS

Figure 1:
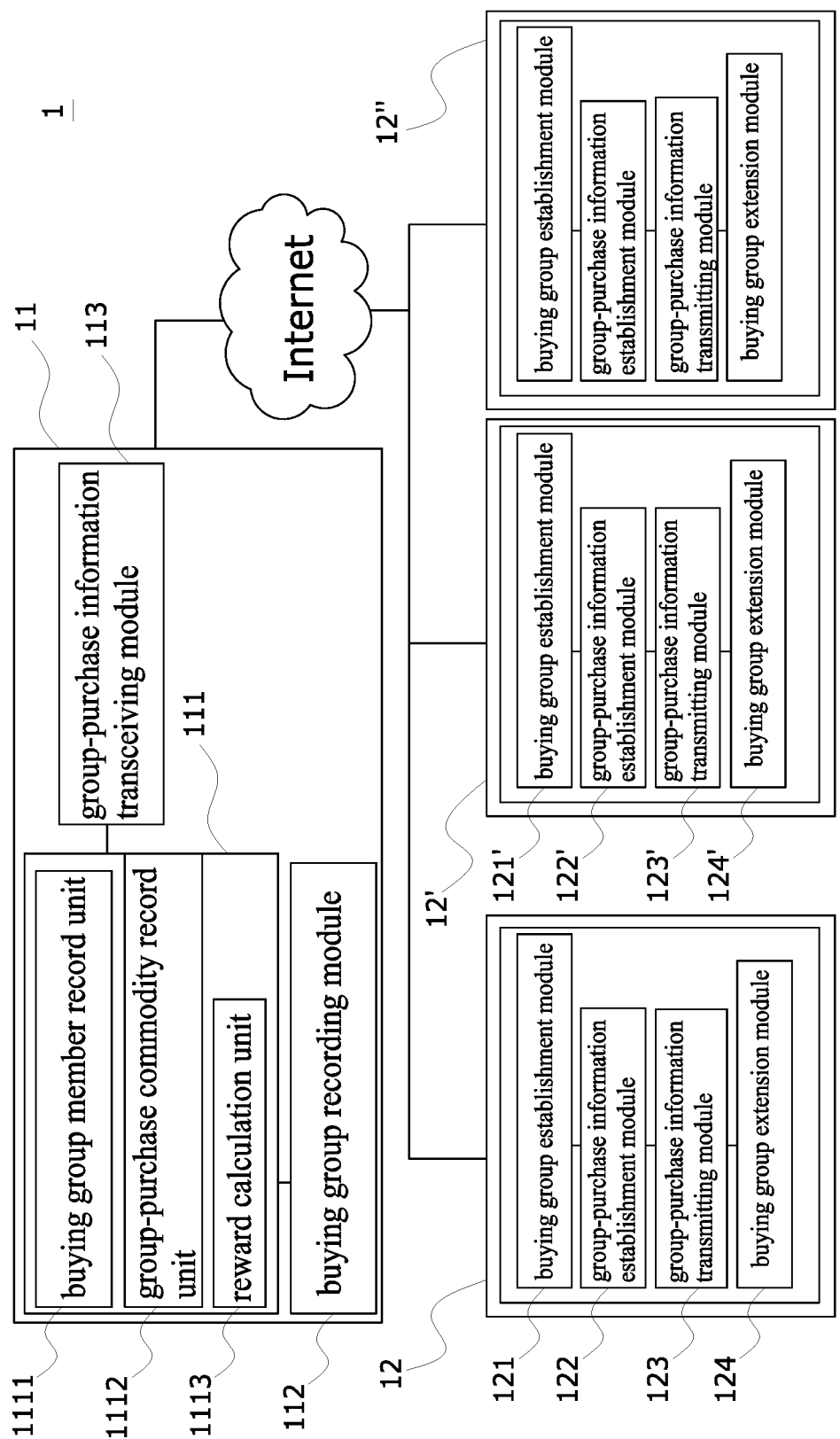
FIG. 1 is a schematic view showing the system composition of the present invention.

Referring to FIG. 1, the mobile group-purchase system 1 of the present invention mainly comprises a group-purchase server 11 and at least one mobile communication device (12, 12', 12"). The mobile group-purchase system 1 includes a group-purchase information recording module 111, a buying group recording module 112 and a group-purchase information transceiving module 113. The buying group recording module 112 and the group-purchase information transceiving module 113 are respectively in information linking to the group-purchase information recording module 111. The group-purchase information recording module 111 has a buying group member record unit 1111, a group-purchase commodity record unit 1112 and a reward calculation unit 1113. The buying group member record unit 1111 stores an identification code of the mobile communication device 12 which has been registered, such that the group-purchase server 11 can identify the identity of the mobile communication devices 12 having the group-purchase application program installed therein. The group-purchase commodity record unit 1112 stores at least one group-purchase information, such as commodity name, buy time, consignment address, commodity introduction, or commodity prices, etc., the group-purchase commodity record unit 1112 can also include other information related to group buying goods, such as commodity prices and pictures, what's more, the group-purchase information can includes different types of goods options and product URL and so on, but not limited to this. The reward calculation unit 1113 can compare the product prices between the original buying group and the extended sub-group and thus calculate the spread profit. The buying group recording module 112 can record and store at least one original buying group and one extended sub-group which has been established. The group-purchase information transceiving module 113 can issue the group-purchase information to the other mobile communication devices 12 to allow users of the other mobile communication devices 12 to join the buying group or to conduct buying activities. The mobile communication device 12 has a group-purchase application program installed therein for the mobile communication device 12 to be in information linking to the group-purchase server 11, such that the mobile communication device 12 can submit buying group membership registration application to the group-purchase server 11, establish buying group, create sub-group and order buying group commodity. The mobile communication device 12 comprises a buying group establishment module 121, a group-purchase information establishment module 122, a group-purchase information transmitting module 123 and a buying group extension module 124. The buying group establishment module 121, after inputting device identification code of at least one mobile communication device 12, submits request for establishing buying group and stores in the group-purchase server 11. The device identification code, for example, can be a mobile phone number, an international mobile equipment identity number (IMEI code), or an self-defined account number, etc., but is not limited to this. The group-purchase information establishment module 122 is available for user to input purchase information. The group purchase information transmitting module 123 can transmit the purchase information to another mobile communication device and transmit it to the group-purchase server 11 for storage. The buying group extension module 124 can further create at least one extended sub-group from original buying group.

Figure 2:
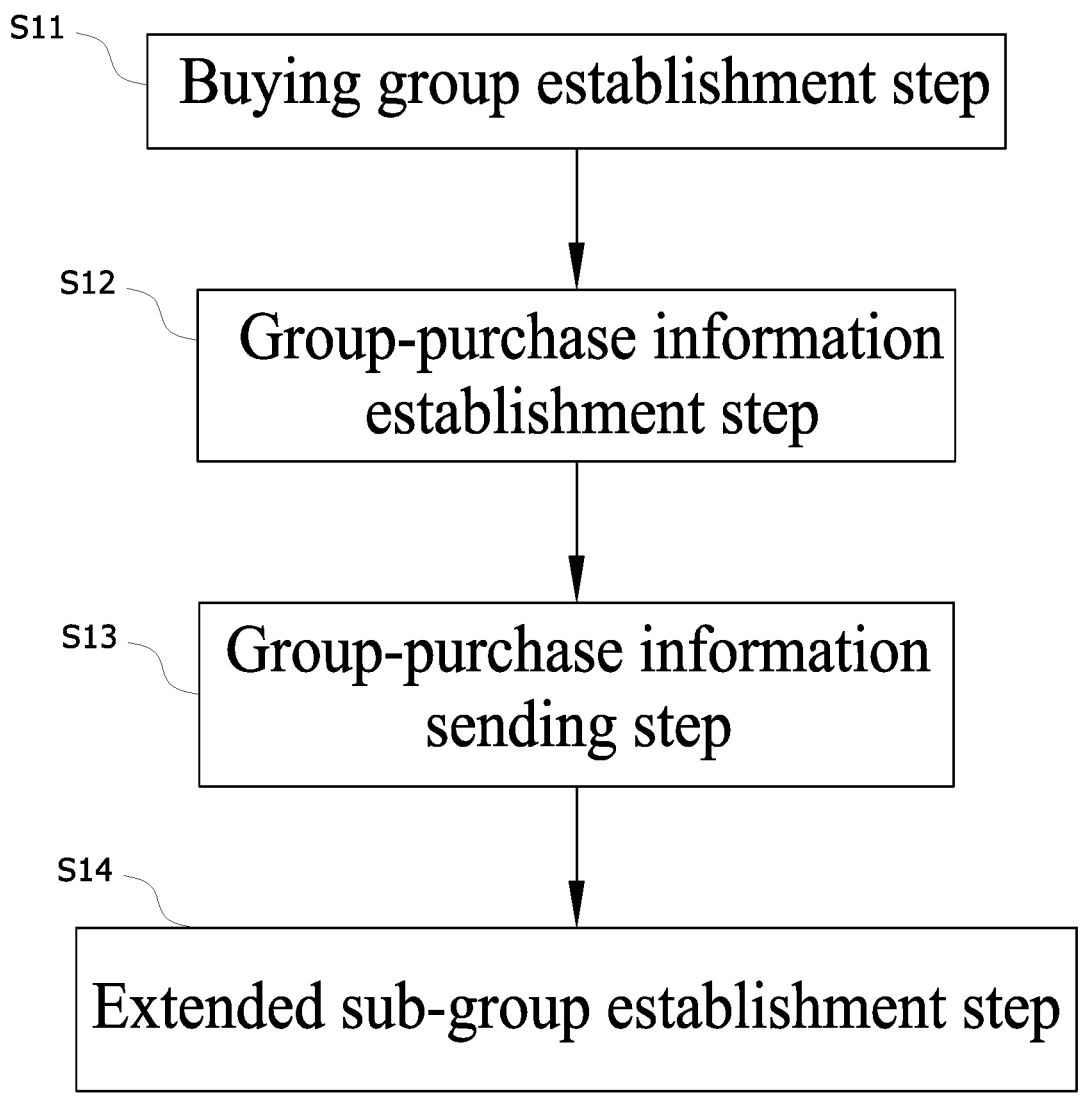
FIG. 2 is an implementing step (I) of the present invention.

Referring to FIG. 2 and to FIG. 3~FIG. 7 simultaneously, the implementation method S1 will be described as below.

Figure 3:
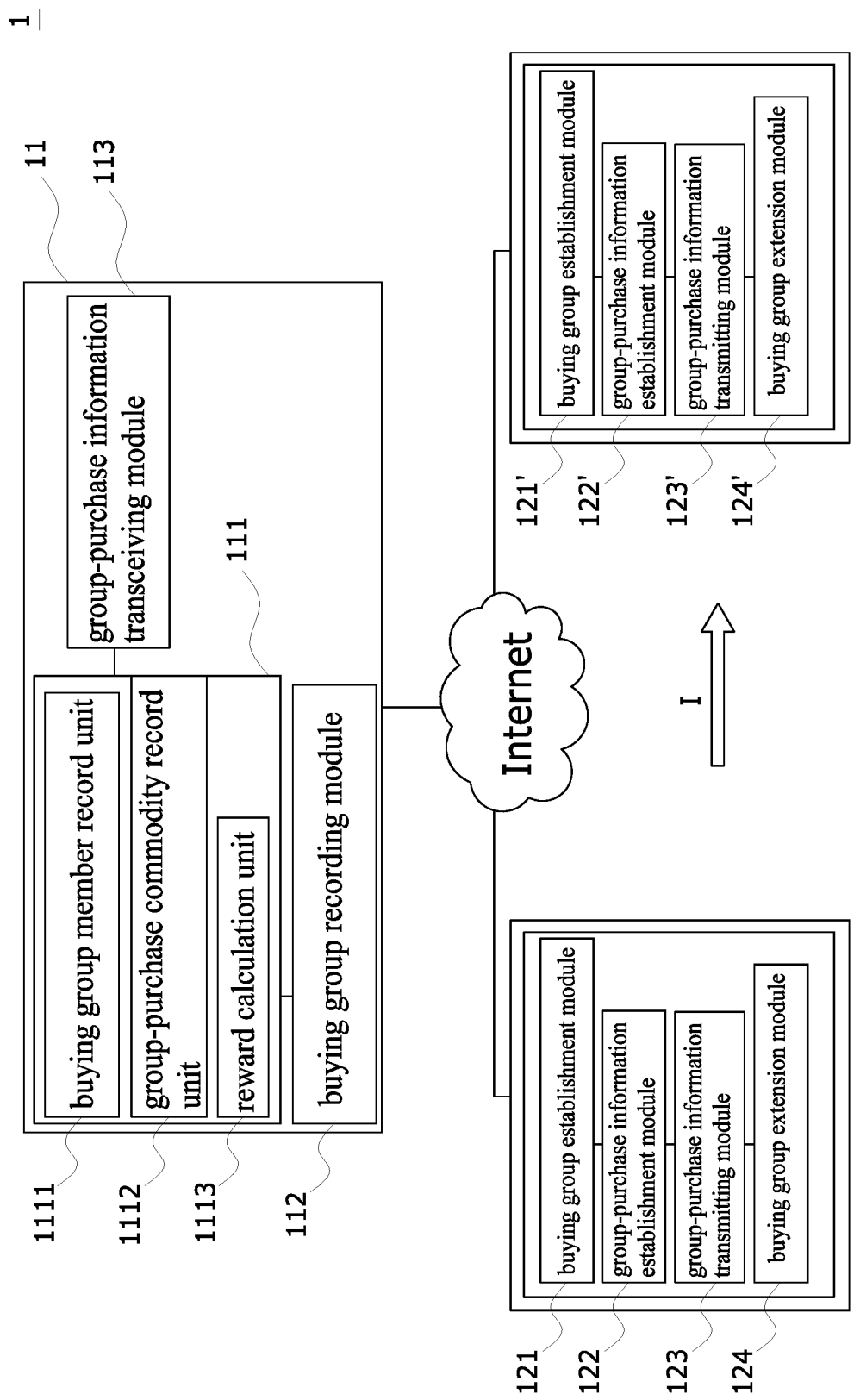
FIG. 3 is a schematic view (I) showing the implementation of the present invention.

(1) Buying Group Establishment Step S11:

As shown in FIG. 3, when an user intends to initiate group purchase activity, the user needs to execute a group-purchase application program of the mobile communication device 12 and further input at least one device identification code (such as a phone number) of another mobile communication device (12', 12" . . . ) through the buying group establishment module 121. Upon completion of the input, the mobile communication device 12 sends an invitation I of the buying group to a plurality of second mobile communication devices (12', 12" . . . ) through the group purchase information transmitting module 123. When the second mobile communication device (12', 12" . . . ) executes the group-purchase application program and accepts the invitation, the mobile communication device 12 and each of the second mobile communication device (12', 12" . . . ) will report to the group-purchase server 11 so that the group-purchase member record unit 1111 of the group-purchase server 11 can execute member's identity authentication. After the authentication is completed, the buying group recording module 112 then records the mobile communication device 12 and the invited second mobile communication device (12', 12" . . . ) in an original buying group.

Figure 4:
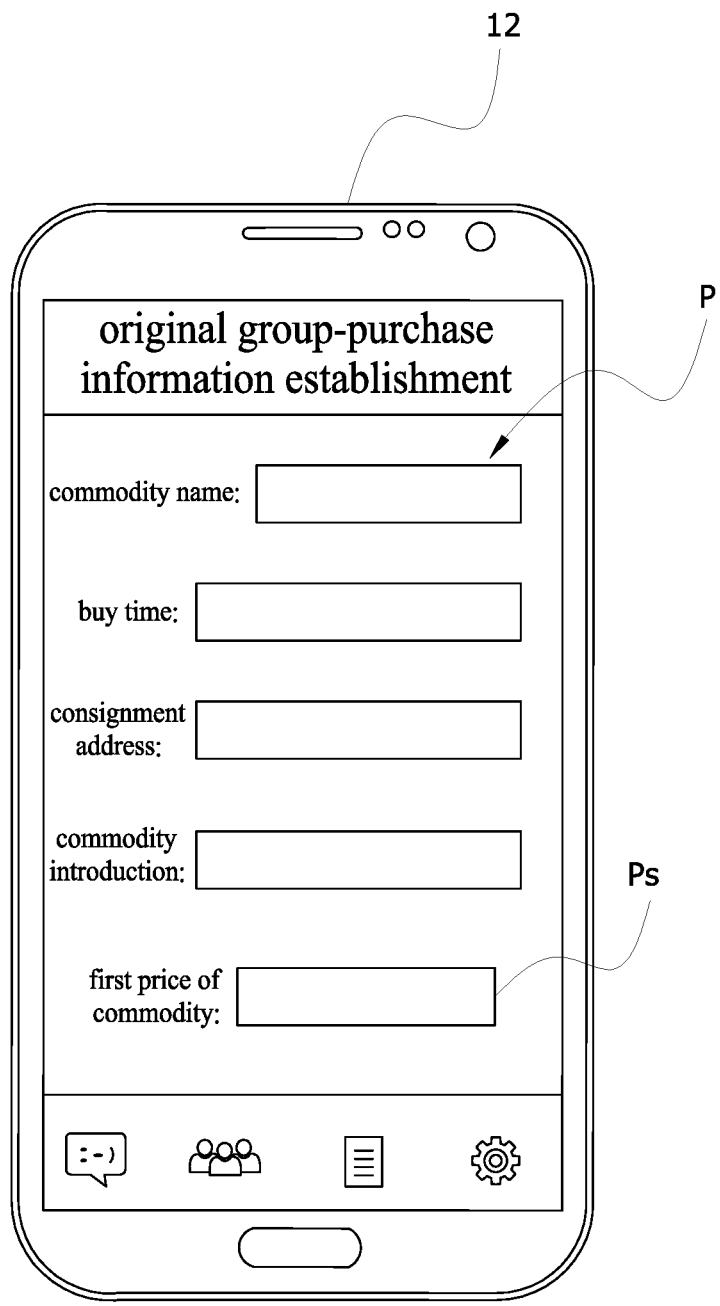
FIG. 4 is a schematic view (II) showing the implementation of the present invention.

(2) Group-Purchase Information Establishment Step S12:

As shown in FIG. 4, when the original buying group is established, the creator of the original buying group can edit a group-purchase information P through the group-purchase information establishment module 122 of the mobile communication device 12. The group-purchase information P includes at least one first price Ps of commodity, further includes commodity name, buy time, consignment address or commodity introduction, etc., or the other information related to group-purchase commodity, such as commodity pictures, commodity trial articles, commodity composition information, etc., what's more, the group-purchase information P can includes different types of commodity options and product websites, etc., but is not limited to this.

Figure 5:
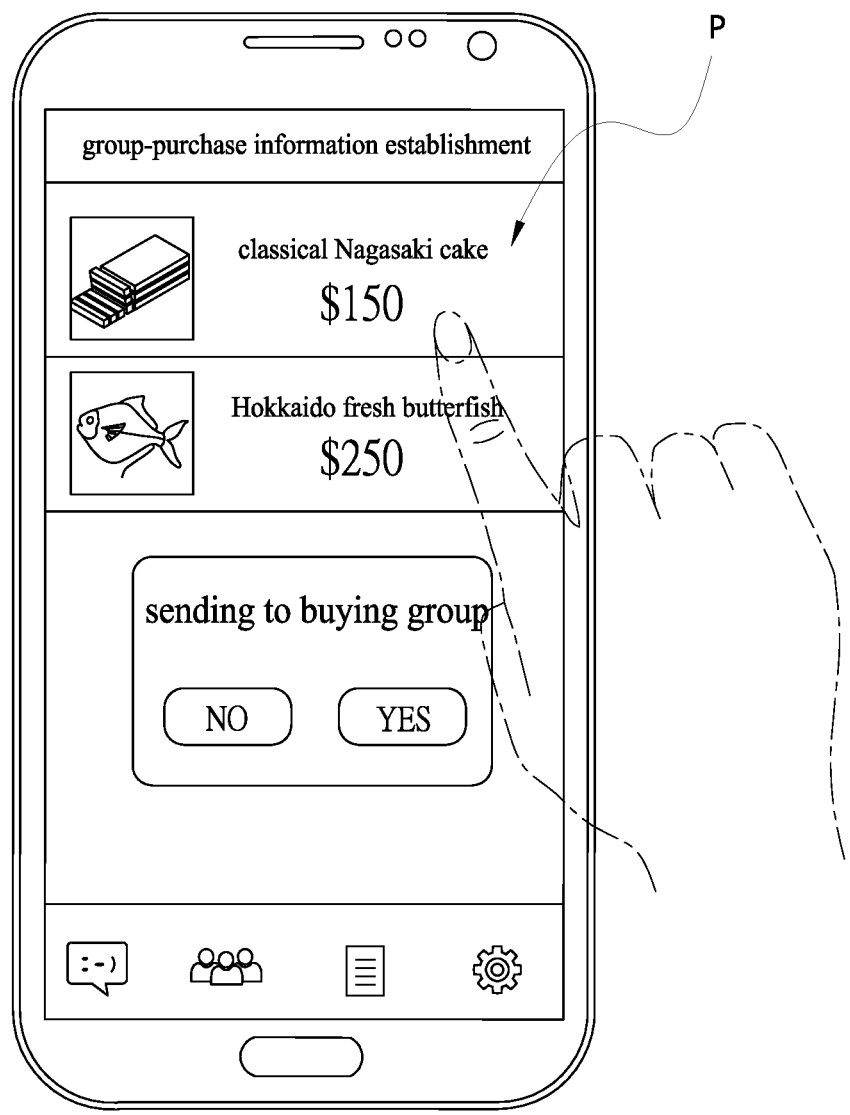
FIG. 5 is a schematic view (III) showing the implementation of the present invention.

(3) Group-Purchase Information Sending Step S13:

As shown in FIG. 5, when the group-purchase information P is established, it can be displayed on the interface of the group-purchase program application of the mobile communication device 12. The mobile communication device 12 can establish a plurality of group-purchase information P, then the mobile communication device 12 can select one of the purchase information P and send the selected group-purchase information P to the original buying group through the group-purchase information transmission module 123 so that all the second mobile communication devices (12', 12" . . . ) can receive the selected group-purchase information P, and then conduct commodity orders through the respective second mobile communication devices (12', 12" . . . ). When the mobile communication device 12 transmits the group-purchase information P to the second mobile communication devices (12', 12" . . . ), the mobile communication device 12 simultaneously transmits the group-purchase information P to the group-purchase server 11 and stores it in the group-purchase commodity record unit 1112.

(4) Extended Sub-Group Establishment Step S14:

As shown in FIG. 6, the implementing step comprises the following:

(4-1) Step of Submitting a Request to Create a Sub-Group S141:

When user wants to establish an extended sub-group, the second mobile communication device 12' in the original buying group executes a group extension modules 124' to send an extended sub-group establishment request to the group-purchase server 11.

(4-2) Step of Sending an Extension Buying Group Invitation S142:

As shown in FIG. 6a, when the group-purchase server 11 receives the request, the buying group establishment module 121' of the mobile communication device 12' can send a buying group invitation I through the group-purchase information transmission module 123' to the other mobile communication devices that have not yet joined the original buying group. The buying group recording module 112 of the group purchase server 11 can synchronously establish and record the second mobile communication device 12' and the other invited mobile communication devices in the extended sub-group.

(4-3) Commodity Price Re-Set Step S143:

Referring to FIGS. 6b~6c, when the extended sub-group has been created, the original buying group and the extended sub-group are in information linking together, so that group-purchase information establishment module 122' of the second mobile communication device 12' can retrieve the group-purchase information P in the original buying group and request the second mobile communication device 12' to reset the first price Ps of the commodity. After the completion of the price-resetting, a second group-purchase information P' and a second price Ps' of commodity are generated which are then sent to the mobile communication device in the extended sub-group (e.g., FIG. 6c) for the other mobile communication devices in the extended sub-group to make order of commodity. The group-purchase server 11 may limit the condition for setting the second price Ps' of commodity and the members of the extended group, for example, the second price Ps' of commodity should be higher than the first price Ps of commodity or the members of the original buying group should not be re-invited into the extended sub-group. In this manner, limiting the commodity price will be able to avoid the loss of the sub-group creator caused by the incoming price to be lower than sale price, while limiting the extended sub-group members will be able to avoid the entry of the participants of the original buying group into the extended sub-group, resulting in the situation of stagnation on commodity sales.

(4-4) Spread Profit Feedback Step S144:

As shown in FIG. 7, when the group-purchase activity is ended, the reward calculation unit 1113 of the group-purchase server 11 will calculate a spread profit by comparing between the first price and the second price of commodity. In other words, the spread profit is the amount of subtracting the second commodity price Ps' from the first commodity price Ps first and then multiplying by the order quantity. After calculating the spread profit, the reward calculation unit 1113 returns the spread profit back to the second mobile communication device 12' which creates the extended buying sub-group. Members of the extended sub-group can also be allowed to create extended sub-group again, the creating process and the spread profit feedback process are described in buying group establishment step S11~extended sub-group establishment step S14, hence description is omitted herein.

Referring to FIG. 8 and continuing from FIGS. 1 to 7, the mobile group-purchase system of the present invention can set up reward condition for feedback incentive. For example, the commodity price is fixed after the original buying group is established. When the original group-purchase activity is initiated, the creator can define the target reward condition parameter. If the commodity order situation can meet the target reward condition, the creator of the extended sub-group can get a preferential discount on commodity order. Another implementation method S2 of the mobile group-purchase system of the present invention will be described as below.

(5) Buying Group Establishment Step S21:

When an user intends to initiate group purchase, the user firstly needs to execute a group-purchase application program of the mobile communication device 12 and further input at least one device identification code (such as a phone number) of the second mobile communication device (12', 12" . . . ) through the buying group establishment module 121. Upon completion of the input, the mobile communication device 12 sends an invitation I of the buying group to a plurality of second mobile communication devices (12', 12" . . . ) through the group purchase information transmitting module 123. When the second mobile communication device (12', 12" . . . ) executes the group-purchase application program and accepts the invitation, the mobile communication device 12 and each of the second mobile communication device (12', 12" . . . ) will report to the group-purchase server 11 so that the group-purchase member record unit 1111 of the group-purchase server 11 can execute member's identity authentication. After the authentication is completed, the buying group recording module 112 then records the mobile communication device 12 and the invited second mobile communication device (12', 12" . . . ) in an original buying group.

(6) Group-Purchase Information Establishment and Reward Condition Setup Step S22:

When the original buying group is established, the creator of the buying group can input a group-purchase information P, a first price of commodity Ps and a target reward condition parameter through the group-purchase information establishment module 122 of the mobile communication device 12. The target reward condition parameter can be set to be the total number of commodity ordered, the total amount of commodity ordered or the total number of commodity orders, etc., but it is not limited to this.

(7) Group-Purchase Information Sending Step S23:

When the group-purchase information P is established, it can be displayed on the interface of the group-purchase program application of the mobile communication device 12. The mobile communication device 12 can establish a plurality of group-purchase information P, then the mobile communication device 12 can select one of the purchase information P and send it to the original buying group through the group-purchase information transmission module 123 so that all the second mobile communication devices (12', 12" . . . ) can receive the selected group-purchase information P and then conduct commodity orders through the respective second mobile communication devices (12', 12" . . . ). When the mobile communication device 12 transmits the group-purchase information P to the second mobile communication devices (12', 12" . . . ), the mobile communication device 12 simultaneously transmits the group-purchase information P to the group-purchase server 11 and stores it in the group-purchase commodity record unit 1112.

(8) Extended Sub-Group Establishment and Reward Feedback Step S24:

After anyone of the mobile communication devices in the original buying group executes the buying group extension module, a buying group invitation I is sent out and thus an extended sub-group is established. When group-purchase activity is ended, the reward calculation unit can judge whether the extended sub-group has reached the target reward condition parameter. If the target reward condition parameter is reached, the reward calculation unit will give a discount on the order and calculate a spread profit which is then fed back to the creator of the extended sub-group. In the present embodiment, the spread profit is the difference between the original commodity price and the price having preferentially discounted.

The invention claimed is:

1. An implementation method of a mobile group-purchase system, said mobile group-purchase system being formed by a plurality of mobile communication devices and a group-purchase server, each of said mobile communication devices having a group-purchase application program installed therein, and each of said mobile communication devices being linked separately with said group-purchase server, wherein said implementation method comprises the following steps:

after a first mobile communication device has executed said group-purchase application program installed therein, an original buying group is established in said group-purchase server, and said mobile communication devices other than said first mobile communication device are invited to join said original buying group, and a first group-purchase information is established in said original buying group, wherein said first group-purchase information including at least a first commodity information, a first price of commodity, and a target reward condition parameter;

after a second mobile communication device has joined said original buying group, an extended sub-group is established in said group-purchase server based on said first group-purchase information created in said original buying group, and a second group-purchase information being established in said extended sub-group, so that the second mobile communication device retrieves the first group-purchase information in said original buying group and requests said second mobile communication device to reset said first price of the commodity, and after that the completion of the price-resetting, said second group-purchase information including a second price of commodity is generated in said extended sub-group; and said second mobile communication device invites the other said mobile communication devices that have not yet joined the original buying group to join said extended sub-group;

wherein said group-purchase server has a group-purchase information recording module having a reward calculation unit therein, said reward calculation unit is configured to calculate the commodity order situation of said extended sub-group, and calculate out a spread profit according to said target reward condition parameter, and the price difference between said first price of commodity and said second price of commodity;

wherein said group-purchase server is also configured to limit the condition for setting said second price of commodity, and limiting said second price of commodity will be able to avoid the loss of creator of said extended sub-group, wherein the loss is caused by the incoming price to be lower than sale price.

2. The implementation method of a mobile group-purchase system as claimed in claim 1, wherein said target reward condition parameter is set to be the total number of commodity ordered.

3. The implementation method of a mobile group-purchase system as claimed in claim 1, wherein said target reward condition parameter is set to be the total number of commodity orders.

* * * * *